United States Patent
Clough et al.

(10) Patent No.: US 7,624,162 B2
(45) Date of Patent: Nov. 24, 2009

(54) METHODS, SYSTEMS, DEVICES AND COMPUTER-READABLE MEDIA FOR ACCESSING NETWORK ACCESSIBLE DEVICES

(75) Inventors: James Clough, Meridian, ID (US); Darrel Cherry, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1562 days.

(21) Appl. No.: 09/929,424

(22) Filed: Aug. 13, 2001

(65) Prior Publication Data

US 2003/0033408 A1     Feb. 13, 2003

(51) Int. Cl.
 *G06F 15/16* (2006.01)
(52) U.S. Cl. ............... 709/220; 709/217; 709/227; 709/228; 709/237; 709/248
(58) Field of Classification Search ............. 710/2–9, 710/107, 109, 300; 345/178, 179; 455/403–406, 455/552.1; 709/236, 203, 217–225, 227–228, 709/237, 248; 370/329; 705/26; 358/1.15
See application file for complete search history.

(56) References Cited

U.S. PATENT DOCUMENTS

| | | | |
|---|---|---|---|
| 5,895,471 A | 4/1999 | King et al. ............... 707/104 |
| 5,912,921 A | 6/1999 | Warren et al. ............ 375/220 |
| 6,167,514 A | 12/2000 | Matsui et al. |
| 6,201,611 B1 | 3/2001 | Carter et al. |
| 6,202,023 B1 | 3/2001 | Hancock et al. ........... 701/201 |
| 6,208,839 B1 | 3/2001 | Davani ................... 455/31.3 |
| 6,219,669 B1* | 4/2001 | Haff et al. ................ 707/10 |
| 6,282,183 B1* | 8/2001 | Harris et al. .............. 370/338 |
| 6,345,294 B1* | 2/2002 | O'Toole et al. ........... 709/222 |
| 6,466,783 B2* | 10/2002 | Dahm et al. .............. 455/414.2 |
| 6,473,609 B1* | 10/2002 | Schwartz et al. ......... 455/406 |
| 6,484,205 B1* | 11/2002 | Byford ................... 709/227 |
| 6,560,640 B2* | 5/2003 | Smethers ................. 709/219 |
| 6,597,903 B1* | 7/2003 | Dahm et al. .............. 455/405 |
| 6,611,259 B1* | 8/2003 | Tillgren et al. ........... 345/179 |
| 6,742,052 B2* | 5/2004 | Himmel et al. ............ 710/2 |
| 6,895,255 B1* | 5/2005 | Bridgelall ................ 455/552.1 |
| 7,089,209 B1* | 8/2006 | Kolls ..................... 705/39 |
| 7,299,256 B2* | 11/2007 | Pradhan et al. ........... 709/203 |
| 2002/0016833 A1* | 2/2002 | Yajima et al. ............ 709/220 |
| 2002/0065873 A1* | 5/2002 | Ishizuka ................. 709/203 |
| 2002/0103875 A1* | 8/2002 | Krishnan et al. ......... 709/217 |
| 2002/0142786 A1* | 10/2002 | Pradhan et al. ........... 455/466 |
| 2002/0184332 A1* | 12/2002 | Kindberg et al. ......... 709/217 |
| 2003/0002073 A1* | 1/2003 | Berkema et al. .......... 358/1.15 |

FOREIGN PATENT DOCUMENTS

| | | |
|---|---|---|
| EP | 0872792 | 10/1998 |
| EP | 1022876 | 7/2000 |
| EP | 1024628 | 8/2000 |

* cited by examiner

Primary Examiner—Alina N. Boutah (57) ABSTRACT

Methods and systems for accessing network-accessible devices are described. In various embodiments, individual network-accessible devices are configured to wirelessly transmit their network address and any other data that can be used to access the device. Wirelessly-enabled client devices that are unaware of the various devices can receive the transmitted network addresses and thus become knowledgeable of these devices. The network addresses can then permit the wirelessly-enabled client devices to access and use the network-accessible devices. Access to the network-accessible devices can take place via any suitable mechanism such as via a wireless network and/or Internet connection.

36 Claims, 6 Drawing Sheets

METHODS, SYSTEMS, DEVICES AND COMPUTER-READABLE MEDIA FOR ACCESSING NETWORK ACCESSIBLE DEVICES

TECHNICAL FIELD

This invention relates to methods and systems for accessing network-accessible devices.

BACKGROUND

Figure 1:
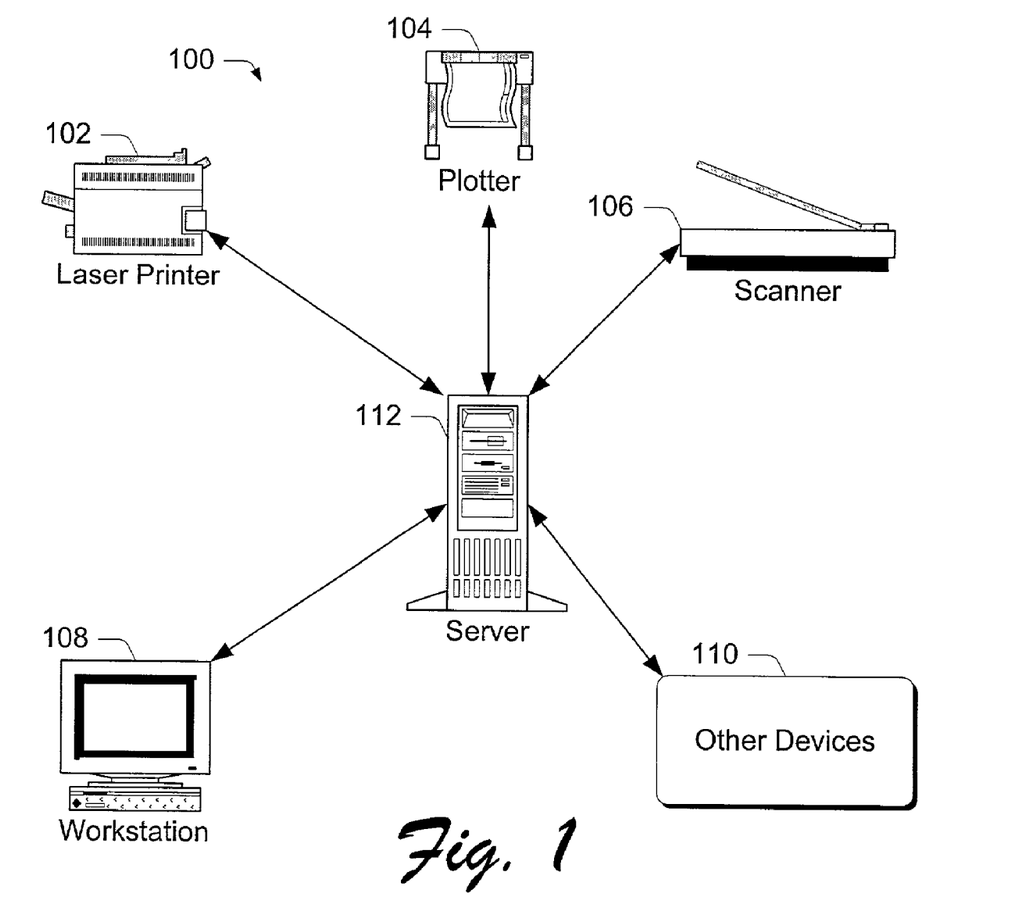
FIG. 1 is a block diagram of an exemplary prior art network system including various network-accessible devices.

Network-accessible devices come in many shapes and sizes. FIG. 1 shows a system 100 having a number of different exemplary network-accessible devices. The network-accessible devices can include one or more printers 102, one or more plotters 104, one or more scanners 106, one or more work stations 108 and various other devices 110 that are or can be typically connected to a network for use. A server 112 can be provided for controlling access to the network-accessible devices.

Figure 2:
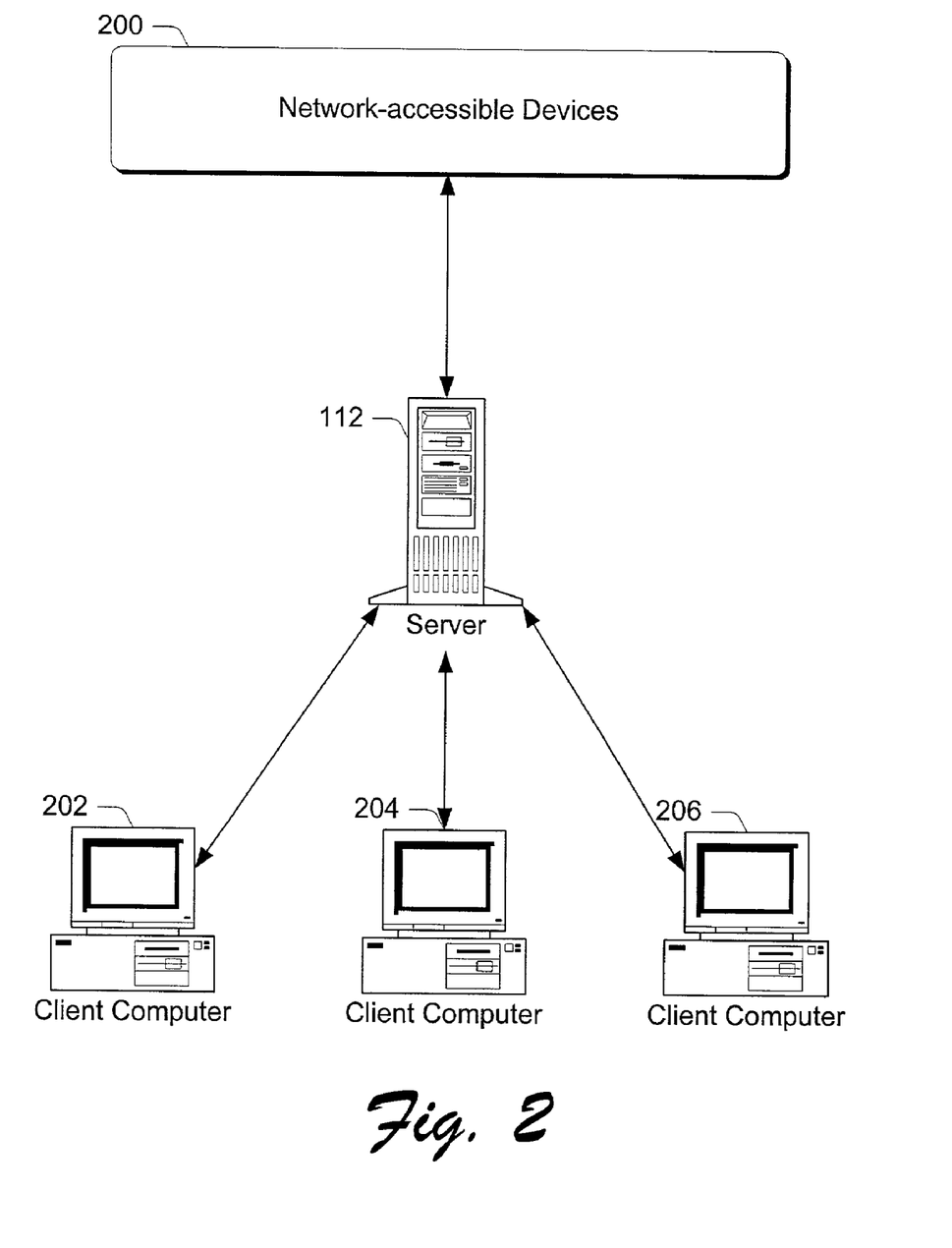
FIG. 2 is a block diagram that illustrates a typical model for accessing various network-accessible devices.

FIG. 2 shows a typical model for accessing various network-accessible devices 200. Various client computers 202, 204, and 206 are communicatively linked, typically by a hardwired connection, with the network-accessible devices through server 112. When the client computers desire to interact with a network-accessible device, this is generally no problem as the client computers are aware of, or can become aware of the network addresses associated with each of the network-accessible devices. For example, it is generally not a difficult operation to add a network printer to a list of available printers for selection on a network. Typically, a user simply pulls up a user interface that can provide a list of available network-accessible devices. By simply selecting a device, the user has now enabled their client computer to access and use the network-accessible device.

This operation is made possible by the fact that all of the client computers are connected to the same network, and the network itself (usually the server 112) is aware of all of its resources or devices that are available for selection. By being hardwired into the network, each client computer can thus discover many different available network-accessible devices.

Consider the situation in which a wireless device is now incorporated into the FIG. 1 system. For example, consider a situation in which a user has a personal digital assistant (PDA) or a wirelessly-enabled laptop computer. Typically, such wireless devices are not able to easily access and use network-accessible devices such as the ones discussed above. This is because they typically lack the necessary data associated with the various devices, e.g. the network addresses of the various devices.

As more and more users continue to use wireless devices, the demand for convenient end user applications will no doubt continue to grow. Accordingly, this invention arose out of concerns associated with providing improved methods and systems for accessing network-accessible devices.

SUMMARY

Methods and systems for accessing network-accessible devices are described. In various embodiments, individual network-accessible devices are configured to wirelessly transmit their network address and any other data that can be used to access the device. Wirelessly-enabled client devices that are unaware of the various devices can receive the transmitted network addresses and thus become knowledgeable of these devices. The network addresses can then permit the wirelessly-enabled client devices to access and use the network-accessible devices. Access to the network-accessible devices can take place via any suitable mechanism such as via a wireless network and/or Internet connection.

BRIEF DESCRIPTION OF THE DRAWINGS

The same numbers are used throughout the drawings to reference like features and components.

DETAILED DESCRIPTION

Overview

Methods and systems for accessing network-accessible devices are described. In various embodiments, individual network-accessible devices are configured to wirelessly transmit their network address and any other data that can be used to access the device. Wirelessly-enabled client devices that are unaware of the various devices can receive the transmitted network addresses and thus become knowledgeable of these devices. The network addresses can then permit the wirelessly-enabled client devices to access and use the network-accessible devices. Access to the network-accessible devices can take place via any suitable mechanism such as via a wireless network and/or Internet connection.

In the discussion that follows, it is to be appreciated and understood that the inventive functionality can be embodied in a number of different ways. Specifically, the functionality can be embodied as computer-readable instructions that are resident on a computer-readable media of some type. The functionality can also be embodied in the form of a single purpose semiconductor device or application specific integrated circuit (ASIC).

Exemplary Client Device

Figure 3:
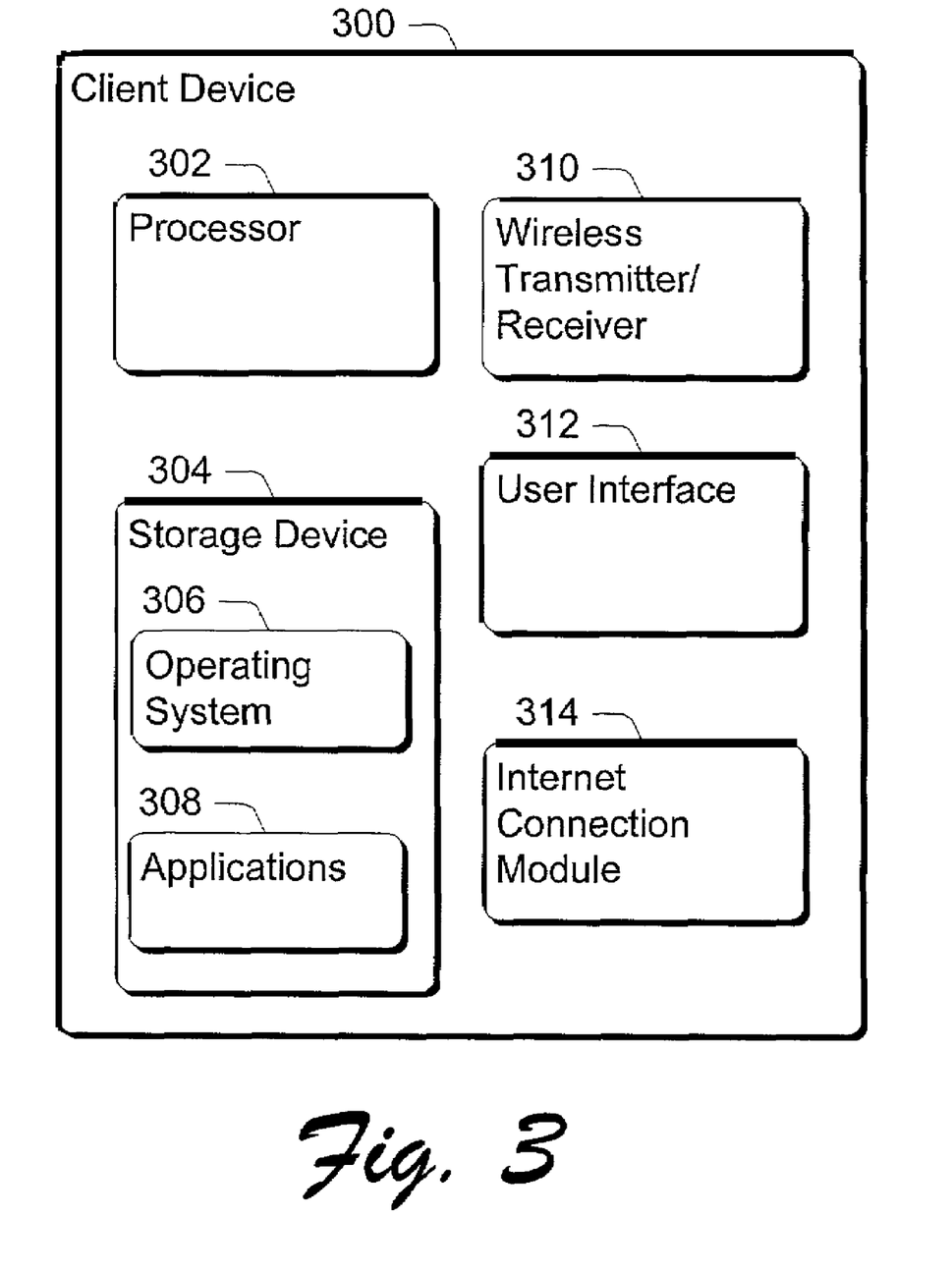
FIG. 3 is a block diagram of an exemplary client device.

FIG. 3 shows an exemplary client device 300 that can be used in connection with the embodiments described below. The client device can comprise any suitable client device. In the illustrated and described embodiment, client device 300 comprises a device that is capable of wireless communication.

Exemplary components of device 300 can include one or more processors 302, also termed "microprocessors". Any suitable microprocessors can be used. A storage device 304 is provided and can comprise any suitable computer-readable medium. Examples include, without limitation, read only memory (ROM), random access memory (RAM), a hard disk, flash memory, EEPROM and the like. Storage device 304 can include an operating system 306 for the device, as well as one or more applications 308 that are executable by the processor 302. The applications 308 typically comprise software applications or instructions that are executable to provide a desired functionality. For example, exemplary applications can include those that provide Internet or network access such as a browser, email capabilities, messaging capabilities, calendaring capabilities and the like. It is to be appreciated and understood that, given that a client device can comprise any number of different types of client devices, the functionalities that are provided by the various applications 308 can vary as well.

In addition, client device 300 includes a wireless transmitter/receiver 310 that is configured to both wirelessly transmit and receive data. The client device can use any suitable techniques, methods, protocols, and the like, to effect wireless transmission (and receipt) of data. For example, the client device can be configured as a bluetooth receiver so that it can receive data in accordance with bluetooth standards.

Client device 300 also includes a user interface (UI) 312. The user interface can be any suitable interface that enables a user to interact with the device. For example, the UI can comprise a screen that displays information for the user under the influence of one or more applications 308. The UI can also comprise various keys and/or buttons that permit the user to interact with the device. The UI can comprise, in addition to visual interaction with the device, an audio interaction component such as a speaker and/or a microphone or voice receiver.

The client device also includes an Internet connection module 314 that is configured to establish an Internet connection using suitable Internet connection techniques. Internet connections can be established with the Internet that are either wireless or wired.

As noted above, the client device 300 can comprise any suitable type of client device. Examples of suitable client devices include, without limitation, personal digital assistants (PDAs), cell phones, mobile computers including laptop computers and the like.

Exemplary Network-Accessible Device

Figure 4:
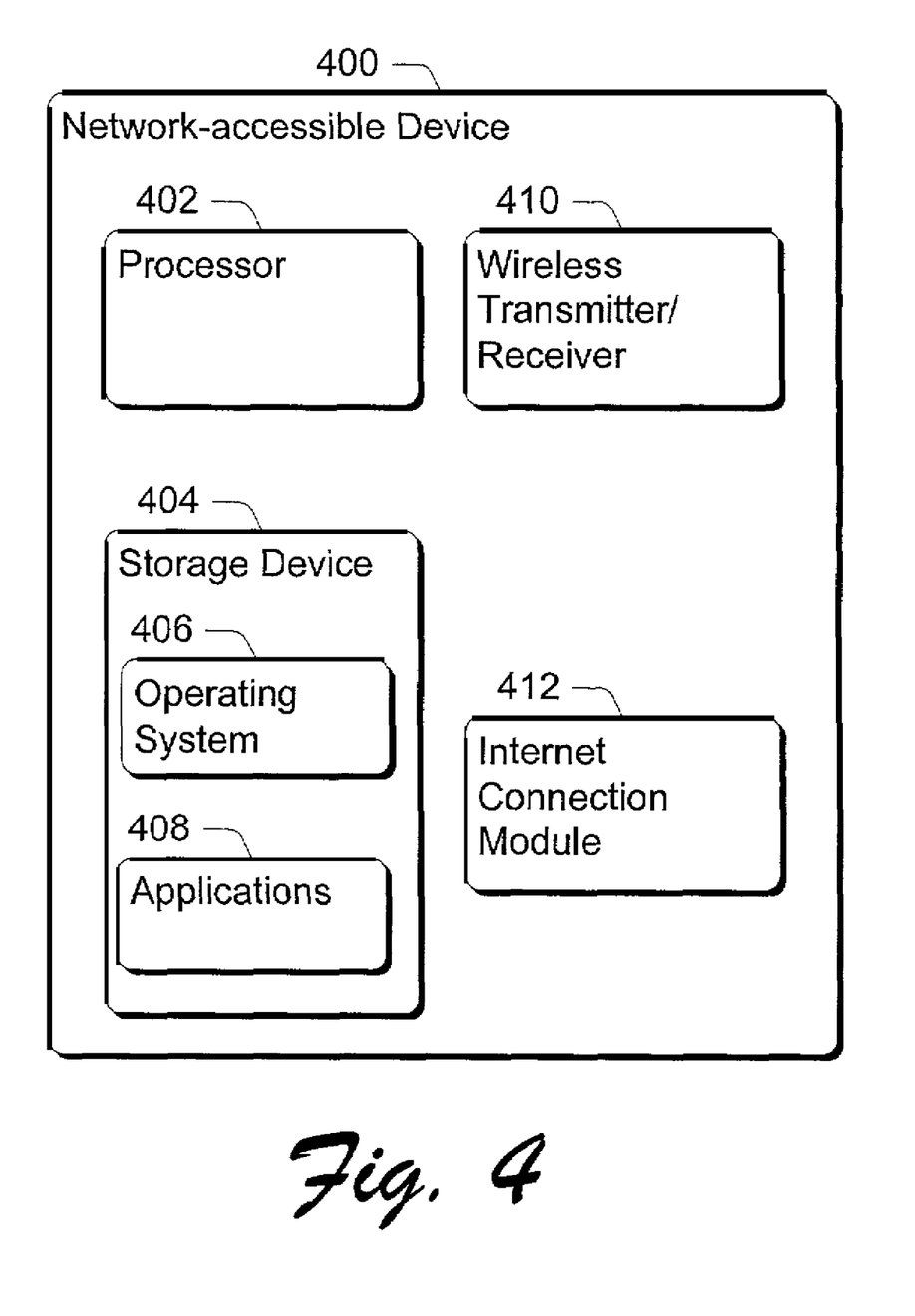
FIG. 4 is a block diagram of an exemplary network-accessible device.

FIG. 4 shows an exemplary network-accessible device 400 that can be used in connection with the embodiments described below. The network-accessible device can comprise any suitable device that is typically accessible via a network. In the illustrated and described embodiment, network-accessible device 400 comprises a device that is capable of wireless communication.

Exemplary components of device 400 can include one or more processors 402, also termed "microprocessors". Any suitable microprocessors can be used. A storage device 404 is provided and can comprise any suitable computer-readable medium. Examples include, without limitation, read only memory (ROM), random access memory (RAM), a hard disk, flash memory, EEPROM and the like. Storage device 404 can include an operating system 406 for the device, as well as one or more applications 408 that are executable by the processor 402. The applications 408 typically comprise software applications or instructions that are executable to provide a desired functionality. For example, in the event that device 400 comprises a printer, applications 408 can comprise applications that are typically associated with printers. Similarly, in the event that device 400 comprises a plotter, scanner, or some other type of device, applications 408 can comprise applications that are usually associated with those types of devices. It is to be appreciated and understood that, given that a network-accessible device can comprise any number of different types of network-accessible devices, the functionalities that are provided by the various applications 408 can vary as well.

In addition, network-accessible device 400 can include a wireless transmitter/receiver 410 that is configured to both wirelessly transmit and receive data. The network-accessible device can use any suitable techniques, methods, protocols, and the like, to effect wireless transmission (and receipt) of data. For example, the client device can be configured as a bluetooth transmitter so that it can transmit data in accordance with bluetooth standards.

The network-accessible device also includes an Internet connection module 412 that is configured to establish an Internet connection using suitable Internet connection techniques. Internet connections can be established with the Internet that are either wireless or wired.

Exemplary Embodiment

Figure 5:
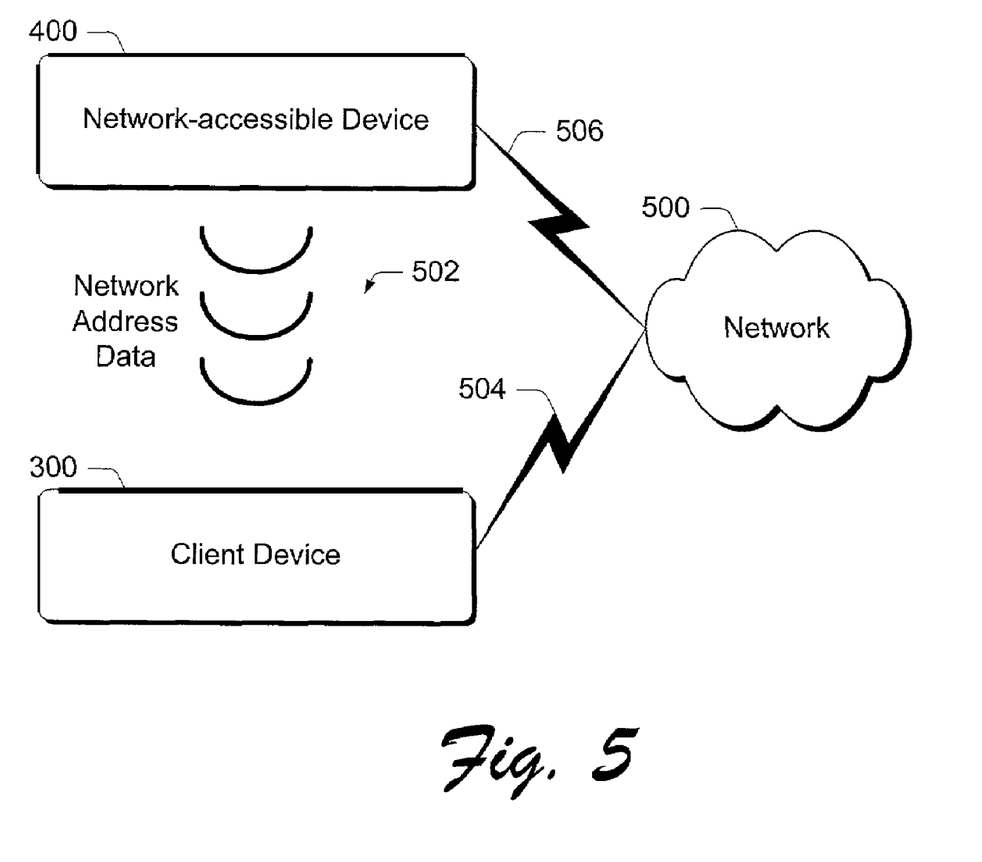
FIG. 5 is a block diagram that illustrates an exemplary interaction between a network-accessible device and a client device in accordance with one embodiment.

FIG. 5 is a block diagram that illustrates various aspects of an inventive system and process by which wirelessly-enabled client devices can become knowledgeable of network-accessible devices, and then use those network-accessible devices for their intended purpose.

FIG. 5 shows a client device 300, a network-accessible device 400 and a network 500. Although network 500 can comprise any suitable network with which various network-accessible devices can be associated, in the present example network 500 comprises the Internet.

In the present example, network-accessible device 400 wirelessly transmits or otherwise beacons its associated address data so that any suitably configured listeners, for example client devices, within range, such as device 300, can receive the address data. Specifically, network-accessible device 400 establishes a wireless link 502 with any suitable listeners such as the client device, and provides address data and any other suitable data to the client device. The address data can comprise a URL that is associated with the network-accessible device. In the illustrated and described embodiment, the network-accessible device 400 can use infrared technology, RF technology, bluetooth technology or any other suitable technology to wirelessly transmit its data. In one embodiment, the wireless technology is selected so that short range transmissions are provided.

As client device 300 now has the address data from network-accessible device 400, it can set about establishing a link with the network-accessible device so that it can use the network-accessible device 400. Specifically, client device 300 is desirably configured to establish an Internet connection using its Internet connection module 314. This connection is preferably a wireless Internet connection or link 504, 506. This Internet connection need not, however, be a wireless connection.

Once a link has been established with the network-accessible device 400, client device 300 can then use the network-accessible device for its intended purpose.

The above-described system permits various client devices to wirelessly discover various network-accessible devices. The discovery process is made possible, in the above example, by the network-accessible devices wirelessly transmitting data that permits the client devices to establish a link with them. Client devices receiving the wirelessly transmitted data can then take steps to establish a link—preferably wireless—so that the client devices can interact with the network-accessible device. The wireless link is desirably a wireless Internet link, although any suitable link can be established.

Exemplary Method

Figure 6:
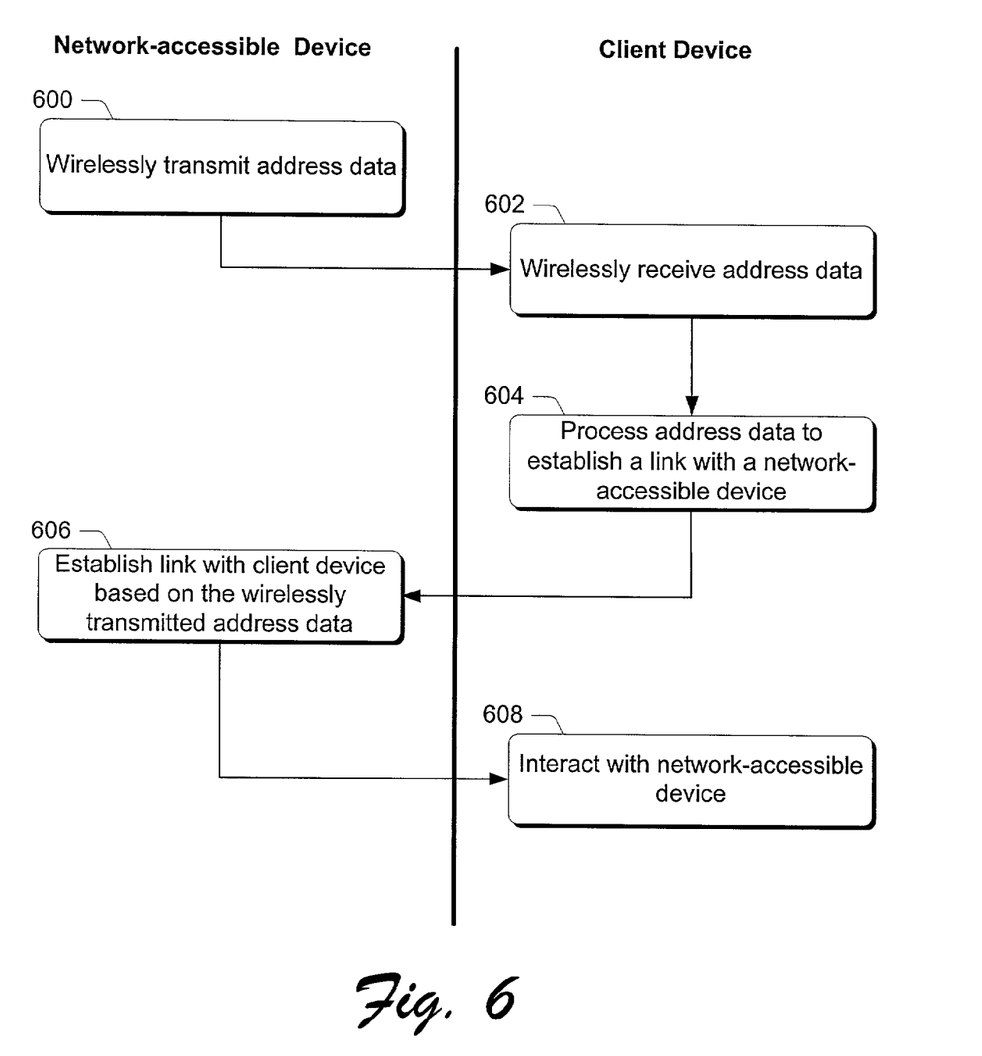
FIG. 6 is a flow diagram that describes steps in a method in accordance with one embodiment.

FIG. 6 is a flow diagram that describes steps in a method in accordance with one embodiment. The steps can be implemented with any suitable hardware, software, firmware, or combination thereof. In the illustrated example, steps of the method are divided into two groups. A first of the groups is designated "Network-accessible Device" and constitutes steps that are performed by a network-accessible device such as the ones described above. A second of the groups is designated "Client Device" and constitutes steps that are performed by a client device.

Step 600 wirelessly transmits address data. This address data can comprise any data that can be used by a client device to access a network-accessible device. For example, the address data can comprise a URL that points to the network-accessible device. This step is implemented by a wireless transmitter that is associated with the network-accessible device. The wireless transmitter can comprise an integrated component of the network-accessible device. Alternately, the transmitter can be a standalone transmitter that beacons address data associated with one or more network-accessible devices.

As an example, consider the following. A user carrying their wirelessly-enabled PDA enters one of their employer's buildings. The building contains multiple different network-accessible devices that would be beneficial for the user to use while in the building. Perhaps the user has some reference material that they desire to print. In addition, the user may have some documents that they forgot to fax before they came over, but would now very much like to electronically fax to an intended recipient in another building. As the user enters the building, a couple of different scenarios can be played out.

In the first scenario, when the user comes within a transmitting proximity of a particular network-accessible device, his PDA wirelessly receives the address data associated with that device and can thus take advantage of the services that it offers. In this example, the user, once in proximity with a printer can use the printer. Similarly, once in proximity with the electronic fax machine, the user can take advantage of its services.

In the second scenario, when the user enters the building they are beaconed address data for all or some of the available network-accessible devices. Accordingly, the user's client device can automatically acquire, in the background, address data associated with network-accessible devices that the user might wish to use. Now, if the user has a need for a particular service, they can simply call up a particular network-accessible device's address data and process the data as described below. This scenario is advantageous in circumstances where use of a particular network-accessible device is not necessarily dependent on a user's physical proximity to the device. Consider again the electronic fax example. The user need not be physically near an electronic fax server in order to electronically transmit a document to the server for purposes of transmission. The user could conceivably be anywhere in the employer's building to take advantage of this service.

Step 602 wirelessly receives the transmitted address data. This step is implemented by a client device and, as noted above, can be implemented in different ways. For example, the address data can be wirelessly received when the client device is in close proximity with the network-accessible device. Alternately, the address data can be wirelessly received when the client device enters into an area associated with multiple different network-accessible devices, e.g. an office building as in the above example. Once the wireless address data is received, step 604 processes the address data to establish a link with a network-accessible device. The link can be established automatically by the client device, or, by a user who can, for example, interact with a suitably configured user interface (UI). Links can be established with multiple different network-accessible devices. Any suitable links can be established as well. The links can be, but need not be, wireless links. In a preferred embodiment, the link is established via the Internet using protocols that are typically associated with the Internet, as will be appreciated by those of skill in the art. The Internet link can be wireless or not.

For example, consider the following. A user carrying a wirelessly-enabled lap top computer enters a building having multiple different network-accessible devices. She proceeds to a conference room where she is to attend a meeting. Once in the conference room, her laptop computer wirelessly receives a network address of a printer in the next room. In this example, the printer is locally transmitting its address data so that client devices that are nearby can receive the data and use the printer. She remembers that she failed to print a fairly lengthy report document that is to be discussed in the meeting. Rather than use a wireless Internet link with the printer, she opts to establish a hard line Internet link with the printer because she needs the document printed right away and time is of the essence. Accordingly, she attaches a cable to her laptop computer and to a jack in the conference room table, calls up the printer via an Internet connection using the printer's URL, and prints her document. In this example, the link that is established by step 604 is a hard link and not a wireless link. The user could, however, have established a wireless Internet link with the printer.

Continuing with the FIG. 6 description, step 606 establishes a link with the client device based on the previously-wirelessly-transmitted address data. This step can be considered as a handshaking step between the client device and the network-accessible device. Step 608 then interacts with the network-accessible device. This step can be implemented in any suitable way. As an example, consider that the network-accessible devices can take many different forms (i.e. printers, plotters, scanners, work stations, electronic facsimile servers, and the like). Accordingly, this step is implemented by interacting with one or more network-accessible devices in a manner that is consistent with the services they provide. Specifically, if the network-accessible device is a printer, then this step is implemented by printing a document; if the network-accessible device is an electronic facsimile server, then this step is implemented by electronically faxing a document, and so on.

CONCLUSION

The methods and systems described above permit network-accessible devices to be wirelessly discovered by client devices, and then used for their intended purpose. In various embodiments, individual network-accessible devices are configured to wirelessly transmit their network address and any other data that can be used to access the device. Wirelessly-enabled client devices that are unaware of the various devices can receive the transmitted network addresses and can thus become knowledgeable of these devices. The network addresses can then permit the wirelessly-enabled client devices to access and use the network-accessible devices. Access to the network-accessible devices can take place via any suitable mechanism such as via a wireless network and/or Internet connection.

Various inventive embodiments provide a mechanism by which local network-accessible devices can be easily discovered and exploited via a preexisting Internet connection. The embodiments can function automatically, in the background, so that a user need not necessarily be aware that address data is being received and used to establish a link with a network-accessible device. This frees up the user for other tasks. If and when the user needs to access a network-accessible device, his or her client device desirably has all of the address data that is needed to enable the user to exploit the network-accessible device. In some embodiments, use of a standard broadband Internet connection can provide a higher level of performance than using a local wireless connection because of speed issues. Other advantages will be apparent to those of skill in the art.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

We claim:

1. A system for accessing network-accessible devices comprising:
   multiple network-accessible devices, each device comprising:
   a wireless transmitter for wirelessly transmitting associated address data for receipt by individual client devices, the address data being configured for use in accessing, via a network, a network-accessible device that wirelessly transmitted the associated address data; and
   a connection module for establishing a network link with one or more client devices based upon the wirelessly transmitted address data, said link permitting individual client devices to access a network-accessible device using the associated address data.

2. The system of claim 1, wherein said link comprises a wireless link.

3. The system of claim 1, wherein said link comprises a wired link.

4. The system of claim 1, wherein said link comprises an Internet link.

5. The system of claim 1, wherein said link comprises a wireless Internet link.

6. A system for accessing Internet-connected printers comprising:
   one or more Internet-connected printers, individual printers comprising:
   a wireless transmitter for wirelessly transmitting associated address data for receipt by individual client devices, the address data being configured for use in accessing, via the internet, an Internet-connected printer that wirelessly transmitted the associated address data; and
   an Internet connection module for establishing an Internet link with one or more client devices based upon the wirelessly transmitted address data, said Internet link permitting individual client devices to access an Internet-connected printer using the associated address data.

7. The system of claim 6, wherein the Internet connection module is configured to establish a wireless Internet link.

8. A network-accessible device comprising:
   one or more processors;
   one or more computer-readable media;
   a wireless transmitter for wirelessly transmitting address data associated with the device, the address data being useable to establish an Internet connection with the device;
   an Internet connection module for establishing an Internet connection; and
   instructions on the computer-readable media which, when executed by the one or more processors, cause the processors to:
   transmit address data for the device using the wireless transmitter;
   establish an Internet connection using the connection module, the Internet connection being establishable with one or more client devices that receive the wirelessly transmitted address data, and being based on the wirelessly transmitted address data; and
   permit interaction with the device via the Internet connection.

9. The network-accessible device of claim 8, wherein the Internet connection comprises a wireless connection.

10. The network-accessible device of claim 8, wherein the Internet connection comprises a wired connection.

11. The network-accessible device of claim 8, wherein the wireless transmitter comprises a bluetooth transmitter.

12. The network-accessible device of claim 8, wherein the address data comprises at least one URL.

13. An Internet-connected printer comprising:
    one or more processors;
    one or more computer-readable media;
    a wireless transmitter for wirelessly transmitting address data associated with the printer, the address data being useable to establish an Internet connection with the printer;
    an Internet connection module for establishing an Internet connection; and
    instructions on the computer-readable media which, when executed by the one or more processors, cause the processors to:
    transmit address data for the printer using the wireless transmitter;
    establish an Internet connection using the Internet connection module, the Internet connection being establishable with one or more client devices that receive the wirelessly transmitted address data, and being based on the wirelessly transmitted address data; and
    permit interaction with the printer via the Internet connection.

14. A client device comprising:
    one or more processors;
    one or more computer readable media;
    a wireless receiver for receiving wirelessly transmitted address data associated with one or more Internet-accessible devices;
    a connection module for establishing an Internet connection; and
    instructions on the computer-readable media which, when executed by the one or more processors, cause the processors to:
    establish an internet connection using the connection module;
    process address data wirelessly received by the wireless receiver from at least one Internet-accessible device; and
    establish an Internet link with one or more Internet-accessible devices using the address data.

15. The client device of claim 14, wherein the Internet connection comprises a wireless connection.

16. The client device of claim 14, wherein the Internet connection comprises a wired connection.

17. The client device of claim 14, wherein the instructions cause the processors to establish a wireless Internet connection.

18. The client device of claim 14, wherein the instructions cause the processors to establish a wired Internet connection.

19. The client device of claim 14, wherein the wireless receiver comprises a bluetooth receiver.

20. The client device of claim 14, wherein the address data comprises a URL.

21. A method for accessing network-accessible devices comprising:
    wirelessly beaconing address data associated with a particular device, the address data being configured for receipt by one or more client devices so that the one or more client devices can use the address data to establish an Internet link with the particular device for interacting with the particular device; and establishing an Internet link with one or more client devices based on the wirelessly beaconed address data, said link permitting interaction between the particular device and the one or more client devices.

22. The method of claim 21, wherein said beaconing is performed by the particular device.

23. The method of claim 21, wherein said beaconing comprises using infrared technology to beacon the address data.

24. The method of claim 21, wherein said beaconing comprises using RF technology to beacon the address data.

25. The method of claim 21, wherein said beaconing comprises using bluetooth technology to beacon the address data.

26. The method of claim 21, wherein said address data comprises a URL.

27. The method of claim 21, wherein said establishing the Internet link comprises establishing a wireless Internet link.

28. One or more computer-readable media having computer-readable instructions thereon which, when executed by one or more processors on a network-accessible device, cause the processors to:
  wirelessly beacon address data associated with the network-accessible device, the address data being configured for receipt by one or more client devices so that the one or more client devices can use the address data to establish an Internet link with the network-accessible device for interacting with the network-accessible device; and
  establish an Internet link with one or more client devices based on the wirelessly beaconed address data, said link permitting interaction with the one or more client devices.

29. A method for accessing Internet-accessible devices comprising:
  discovering one or more Internet-accessible devices by wirelessly receiving one or more URLs associated with and transmitted by the Internet-accessible devices;
  establishing an Internet connection with the one or more internet-accessible devices based on the one or more URLs; and
  interacting with the one or more Internet-accessible devices via the Internet connection.

30. The method of claim 29, wherein said establishing comprises establishing a wireless Internet connection.

31. The method of claim 29, wherein said establishing comprises establishing a wired Internet connection.

32. A method of accessing an Internet-connected printer comprising:
  wirelessly receiving, with a client device, address data associated with one or more Internet-connected printers;
  processing the address data with the client device to establish an Internet link with one or more Internet-connected printers; and
  interacting with the Internet-connected printers via the Internet link.

33. The method of claim 32, wherein said wirelessly receiving comprises bringing the client device into close proximity with an Internet-connected printer that is transmitting address data.

34. The method of claim 32, wherein said processing comprises establishing a wireless Internet link using the address data.

35. The method of claim 32, wherein said processing comprises establishing a wired Internet link using the address data.

36. One or more computer-readable media having computer-readable instructions thereon which, when executed by one or more processors on a client device, cause the processors to:
  wirelessly receive, with the client device, address data associated with one or more Internet-connected printers;
  process the address data with the client device to establish an Internet link with one or more Internet-connected printers; and
  interact with the Internet-connected printers via the Internet link.

* * * * *

UNITED STATES PATENT AND TRADEMARK OFFICE
CERTIFICATE OF CORRECTION

| | | |
|---|---|---|
| PATENT NO. | : 7,624,162 B2 | Page 1 of 1 |
| APPLICATION NO. | : 09/929424 | |
| DATED | : November 24, 2009 | |
| INVENTOR(S) | : James Clough et al. | |

It is certified that error appears in the above-identified patent and that said Letters Patent is hereby corrected as shown below:

In column 7, line 38, in Claim 6, delete "internet," and insert -- Internet, --, therefor.

In column 8, line 41, in Claim 14, delete "internet" and insert -- Internet --, therefor.

In column 9, line 38, in Claim 29, delete "internet-accessible" and insert
-- Internet-accessible --, therefor.

Signed and Sealed this

Thirty-first Day of August, 2010

David J. Kappos
*Director of the United States Patent and Trademark Office*